ved for holding the boat and swingable frame in its
United States Patent
Jenkins

[11] 3,871,540
[45] Mar. 18, 1975

[54] DEVICE FOR LOADING AND CARRYING BOATS ON PICKUP TRUCKS

[75] Inventor: Otto L. Jenkins, Union Lake, Mich.

[73] Assignee: Smitty's Easy Tow, a part interest

[22] Filed: Dec. 12, 1973

[21] Appl. No.: 424,043

[52] U.S. Cl. .............................. 214/450, 214/85.1
[51] Int. Cl. ............................................. B60p 3/10
[58] Field of Search ............ 214/450, 85, 85.1, 501, 214/517, 505; 296/3, 1 A; 224/29 R, 42.1 R, 42.1 H

[56] References Cited
UNITED STATES PATENTS

| | | | |
|---|---|---|---|
| 2,722,326 | 11/1955 | Conroy | 214/450 |
| 3,082,892 | 3/1963 | Cox | 214/505 |
| 3,170,583 | 2/1965 | Meyer | 214/450 |
| 3,343,696 | 9/1967 | Morrison | 214/450 |
| 3,411,644 | 11/1968 | Cook | 214/450 |
| 3,708,081 | 1/1973 | Schladenhauffen | 214/450 |

Primary Examiner—Robert J. Spar
Assistant Examiner—Jerold M. Forsberg
Attorney, Agent, or Firm—Harness, Dickey & Pierce

[57] ABSTRACT

A stationary frame is mounted on the box of a pickup truck approximately at cab roof level. A swingable frame is carried thereby and movable between an inclined loading position and a generally horizontal carrying position. The swingable frame has longitudinal side members, a central track and cross members for guiding and supporting the inverted craft being loaded or unloaded; extensions on the central track reach the ground when the swingable frame is in its inclined position. A cable and winch are used to move the craft onto the swingable frame, and latch means are provided for holding the boat and swingable frame in its carrying position. The device is so constructed as to permit a "fifth wheel" type of trailer hitch to be used between the pickup truck and a conventional trailer, if desired.

13 Claims, 7 Drawing Figures

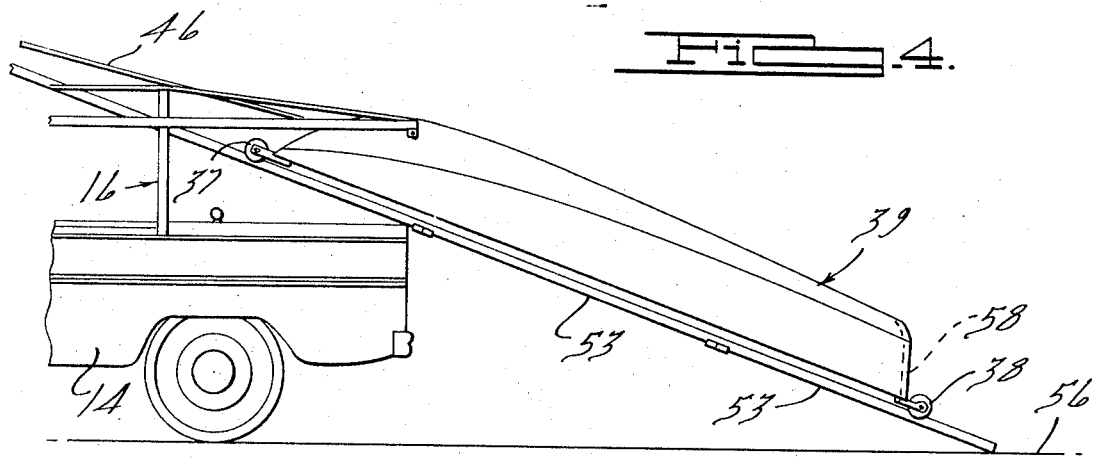
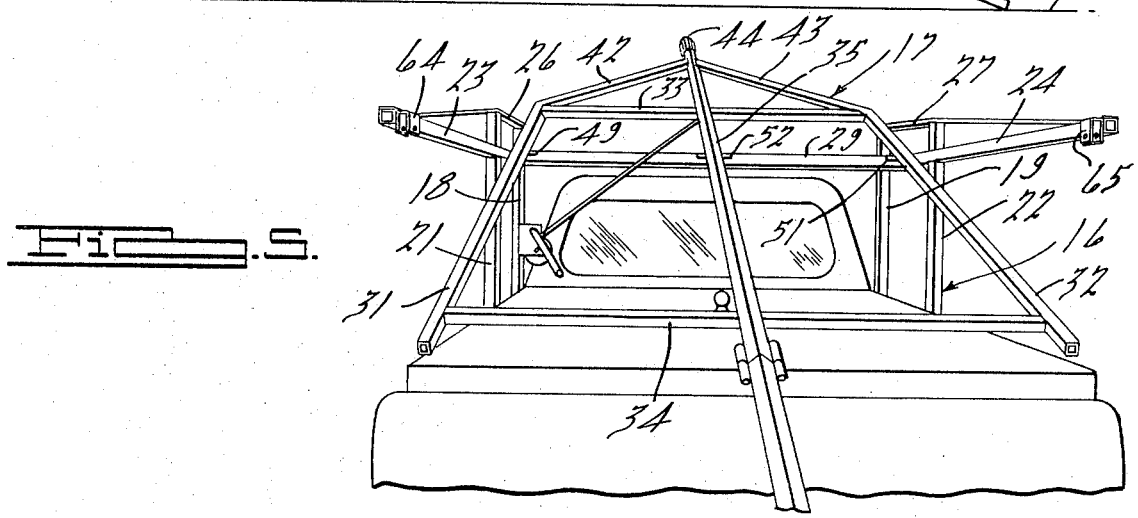
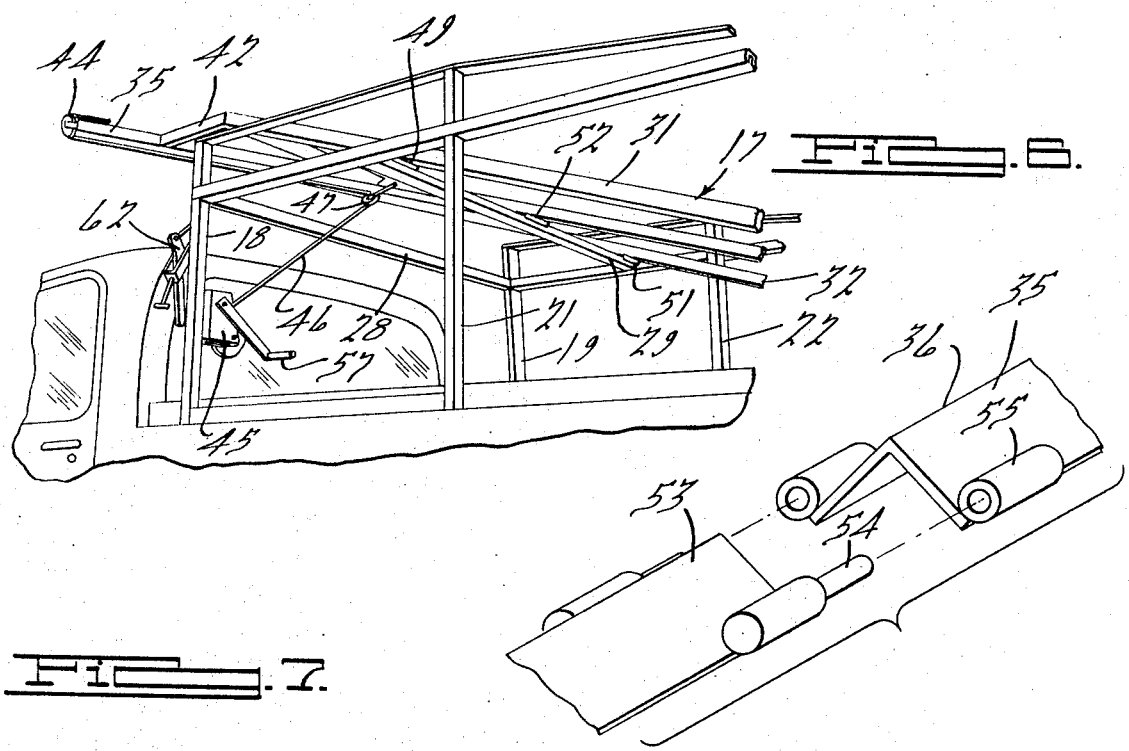

DEVICE FOR LOADING AND CARRYING BOATS ON PICKUP TRUCKS

BACKGROUND OF THE INVENTION

1. Field of the Invention

The invention relates to recreational uses of pickup trucks, and more particularly to devices for permitting pickup trucks to be used for the transportation of small craft, as well as possible simultaneous use for "fifth wheel" trailer towing.

2. Description of the Prior Art

Among the patents found in a search on this subject matter are Morrison U.S. Pat. No. 3,343,696 and Cook U.S. Pat. No. 3,411,644. However, these structures do not have the simplicity and stability of the present invention and operate in a different manner. Moreover, they do not enable the pickup truck to be used simultaneously with boat transport, to tow a recreational trailer with a "fifth wheel" type of hitch, that is, a hitch in which a conventional recreational trailer is connected to the pickup truck by a ball-and-socket connection which is approximately over the rear axle. Such a trailer hitch construction is shown in my copending application, Ser. No. 404,164 Filed, Oct. 9, 1973.

Other patents discovered in the search but which are not believed to affect the patentability of the present invention are Slown U.S. Pat. No. 3,648,866; Martin U.S. Pat. No. 3,732,998; Long et al. U.S. Pat. Ho. 3,734,321; Mabry U.S. Pat. No. 3,048,291; and Cox U.S. Pat. No. 3,082,892.

BRIEF SUMMARY OF THE INVENTION

It is an object of the present invention to provide a novel and improved device for loading and carrying boats on pickup trucks which is extremely simple, efficient, and reliable and carries the boat in an inverted and therefore protected position.

It is another object to provide an improved device of this type which in its carrying position will not interfere with a "fifth wheel" type of hitch between the pickup truck and a conventional trailer.

BRIEF DESCRIPTION OF THE DRAWINGS

FIG. 4 is a side elevational view of the rear portion of the invention showing the manner in which the track extensions enable the boat to be loaded onto the swingable frame;

FIG. 5 is a perspective view of the invention from the rear, showing further details of the construction as well as the free spaces which permit use of the "fifth wheel" trailer hitch;

FIG. 6 is a fragmentary perspective view from one side showing the cable winch and latch means for the boat and swingable frame; and FIG. 7 is a fragmentary detailed perspective view showing the manner in which the extensions are connected to each other and to the main track.

DESCRIPTION OF THE PREFERRED EMBODIMENT

Figure 1:
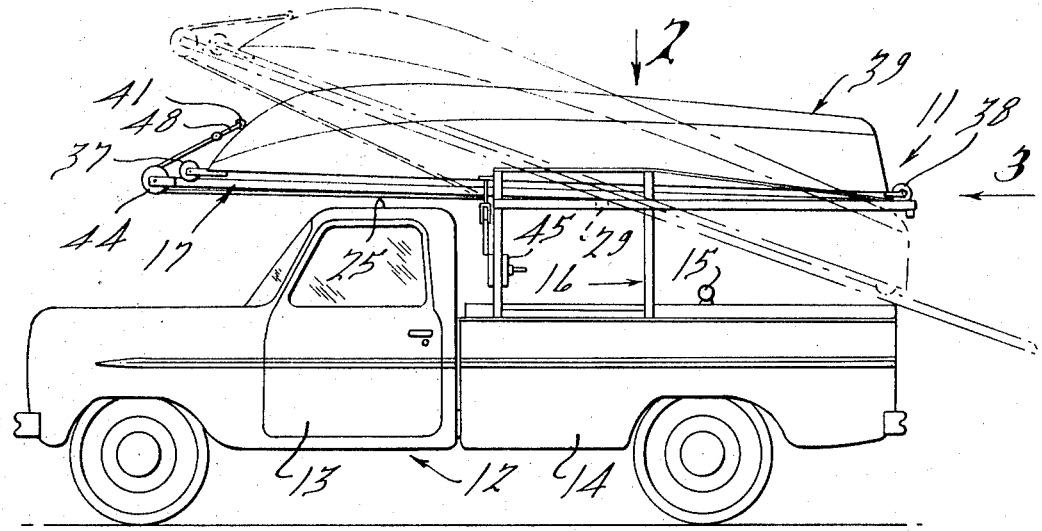
FIG. 1 is a side elevational view of a pickup truck incorporating this invention.
Figure 2:
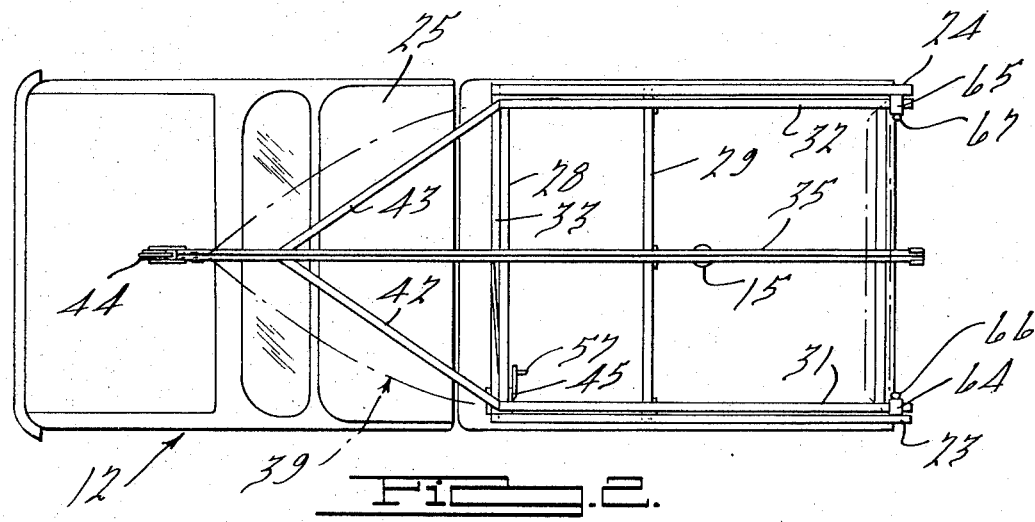
FIG. 2 is a top plan view thereof taken in the direction of the arrow 2 of FIG. 1.

The boat loading and carrying device is generally indicated at 11 and is mounted on a pickup truck generally indicated at 12 having a cab 13 and a box 14. A ball 15 of a trailer hitch is shown as being mounted slightly above the level of the top of box 14 and approximately over the rear axle. Although this trailer hitch ball does not form part of the present invention, the boat loading and carrying device is especially adapted to permit such a "fifth wheel" trailer hitch connection as is described and claimed in my aforementioned copending application.

The boat loading and carrying device comprises a fixed frame generally indicated at 16 and a swingable frame generally indicated at 17. The fixed frame comprises two posts 18 and 19 (FIG. 5) adjacent the forward end of box 14 and a second pair of posts 21 and 22 at an intermediate portion of the box. Posts 18, 19, 21, and 22 may be secured to the box by any appropriate means such as bolts extending hortizontally through apertures conventionally provided in the walls. The posts support a pair of longitudinal members 23 and 24 which are about the length of box 14 and at approximately the level of cab top 25. The members extend approximately to the rearward end of box 14, and it will be noted in FIGS. 4 and 5 that there are clear spaces between the rearward portions of members 23 and 24 and the truck box.

Posts 18, 19, 21, and 22 have portions extending above members 23 and 24, and a pair of straps 26 and 27 are secured to the tops of the posts and extend downwardly and rearwardly in an inclined manner (FIGS. 1 and 5) to the rearward ends of members 23 and 24 to which they are secured, thereby supporting these ends.

A pair of cross members 28 and 29 extend between and are at the level of longitudinal members 23 and 24. Cross member 28 is at the location of posts 18 and 19 whereas member 29 is somewhat forwardly of posts 21 and 22 and acts as a pivotal support for swingable frame 17.

The swingable frame comprises the pair of longitudinal members 31 and 32 slightly inwardly of members 23 and 24 respectively, and cross members 33 and 34 adjacent the forward the rear ends of members 31 and 32 respectively. A central track 35 is supported by cross members 33 and 34 and extends both forwardly and rearwardly thereof. This track may be in the form of an angle iron (FIG. 7) the apex 36 of which is uppermost so as to form a guide for one or more grooved rollers 37 and 38 secured to the forward and after ends of a boat generally indicated at 39. This boat is a relatively small craft such as a rowboat or outboard-powered boat and is conventionally provided with an eye 41 (FIG. 1) in the bow. The beam of boat 39 may be equal to or somewhat narrower than the width of swingable frame 17, and the length may be such that the boat, when in its carrying position, is disposed above the cab and box of the truck 12, although it may extend forwardly of the cab to some extent. The inverted position of the boat will prevent any tendency of the wind to lift the boat, and will split the wind in a manner which lessens wind resistance of the boat itself as well as partially shielding a trailer if one is being towed.

A pair of members 42 and 43 (FIGS. 5 and 6) are secured to the forward end of members 31 and 32 respectively and are inclined toward each other in a forward direction, the forward ends of these members being secured to track 35. The track extends beyond these members and carries a cable sheave 44 at its forward end.

A cable winch 45 is mounted on post 18 and has a cable 46 which extends around a guide pulley 47 secured to the underside of track 35 and around sheave 44. The end of the cable has a hook 48 engageable with eye 41 to pull craft 39 onto frame 17. Pivot members 49, 51 and 52 are secured to the undersides of members 31, 32 and track 35 respectively and are engageable with cross member 29. Frame 17 is swingable between the inclined dot-dash line position of FIG. 1 in which the boat may be loaded or unloaded, and the approximately horizontal carrying position shown in solid lines of FIG. 1.

One or more extensions 53 are provided for track 35 (FIGS. 4 and 7). These extensions have the same cross-sectional shape as track 35 and are connectable to it or each other by any appropriate means such as pins 54 and sockets 55 secured to the abutting members. When assembled, extensions 53 will create a continuous track leading from ground level 56 (FIG. 4) all the way to the forward end of swingable frame 35.

Figure 3:
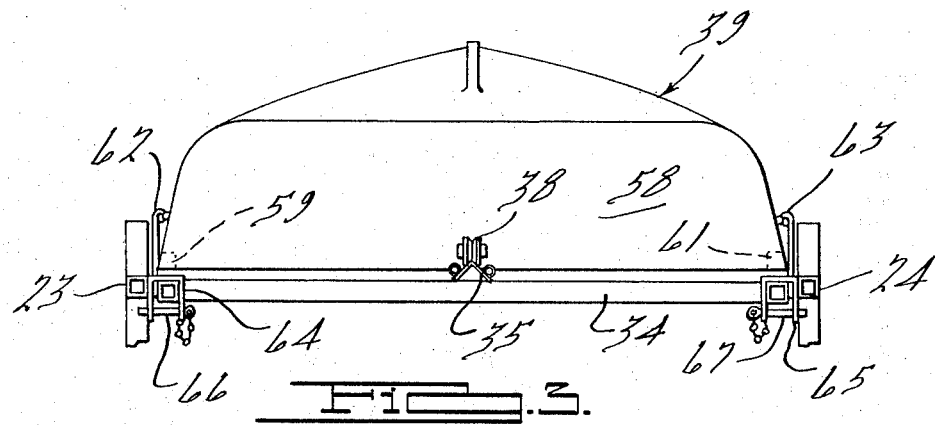
FIG. 3 is a fragmentary rear elevational view of the invention taken in the direction of the arrow 3 of FIG. 1.

In use, frame 17 will be swung to its inclined or loading position and extensions 53 assembled thereto. With cable 46 fully extended, an inverted boat 39 resting on ground 56 may have its forward roller 37 placed at the lower end of the lowest extension 53 and winch handle 57 cranked to wind up the cable. As the boat is pulled up the track, its transom 58 will maintain its stability in a lateral direction. By the time transom 58 leaves ground 56 and roller 38 is on the lowermost track extension 53, the gunwales 59 and 61 (FIG. 3) of the craft will be engageable either with longitudinal members 31 and 32 or cross member 34 to maintain lateral stability. Crank 57 will continue to be turned until the boat is in its fully raised position as shown in dot-dash lines in FIG. 1, with roller 37 engaging sheave 44.

Extensions 53 may then be disassembled and frame 17 together with boat 39 swung to its carrying position shown in solid lines in FIG. 1. A pair of conventional toggle clamps 62 and 63 (FIGS. 3 and 6) are mounted on posts 18 and 19 respectively, only clamp 62 being shown in FIG. 6. These clamps are engageable with the sides of the midship portion of boat 39 and with swingable frame 17 to lock the frame in its carrying position and to secure the boat to the swingable frame. Additionally, a pair of downwardly open channel-shaped retainers 64 and 65 (FIGS. 3 and 5) are secured to the insides of the rearward ends of members 23 and 24. These retainers will receive the adjacent ends of members 31 and 32, and locking pins 66 and 67 may be inserted to hold the swingable frame in its carrying position.

It will thus be seen that the device of this invention not only enables a small boat to be conveniently loaded onto and carried by the pickup truck but allows the entire box 14 of the truck to be utilized and at the same time permits use of the "fifth wheel" trailer hitch described above.

When it is desired to unload the boat, pins 66 and 67 will be withdrawn, clamps 62 and 63 released, and frame 17 swung back to its inclined position. With extensions 53 mounted in place, cable winch 45 may be released and crank 57 rotated to lower the boat in a controlled manner until it reaches the ground. I claim:

1. A device for loading and carrying inverted boats on pickup trucks comprising a fixed frame and a swingable frame, said swingable frame having side portions and being capable of receiving and supporting a boat thereon, means on said fixed frame pivotally supporting an intermediate portion of said swingable frame on a fixed pivot relative to both said fixed and swingable frames above the box of said pickup truck at approximately cab top level, the swingable frame being pivotable but non-slidable with respect to said fixed frame on said fixed pivot between an inclined position in which a boat may be moved upwardly onto the swingable frame, and a generally horizontal carrying position, extension means disposable between said swingable frame and the ground when the swingable frame is in its inclined position to provide a track so that a boat may be shifted along said extension means and completely onto said swingable frame, and means on said fixed frame for engaging and locking said swingable frame to said fixed frame when in said carrying position, said swingable frame having a track intermediate the side portions thereof for supporting rollers on the forward and after portions of said boat when the latter is inverted.

2. The combination according to claim 1, said fixed frame having a pair of longitudinal members extending approximately the full length of said box, said supporting means having upright members only at the forward and intermediate portions of the box, whereby a clear space exists between said longitudinal members and the rearward portion of the box.

3. The combination according to claim 2, said swingable frame having a pair of longitudinal members slightly inwardly of said fixed frame longitudinal members and a plurality of cross members.

4. The combination according to claim 2, further provided with a cable winch mounted on said fixed frame and carrying a cable extendable around a sheave at the forward end of said swingable frame for loading the boat.

5. The combination according to claim 2, said fixed frame having one cross member which acts as a pivotal support for said swingable frame, a central track and longitudinal members on said swingable frame, and pivots on said longitudinal swingable frame members and said central track supported by said fixed frame cross member.

6. The combination according to claim 1, said fixed frame having a first and second pairs of posts adjacent the forward and intermediate portions of the truck box respectively, longitudinal members below the tops of said posts, and a pair of straps secured to the tops of said posts and extending rearwardly to support the rearward ends of said longitudinal members.

7. The combination according to claim 1, said locking means comprising downwardly open members secured to the rearward portion of said fixed frame for receiving rearward portions of said swingable frame, and locking means for holding said swingable frame in place in said downwardly open members.

8. The combination according to claim 1, said swingable frame having a central track for supporting rollers on the bow and stern of said boat when the latter is inverted.

9. The combination according to claim 1, wherein said intermediate track is a central track and said central track comprises an angle member with its apex uppermost.

10. The combination according to claim 9, said extension means comprising at least one additional angle member removably securable in abutting relation with said central track for enabling the track to reach the ground when the swingable frame is in its inclined position.

11. The combination according to claim 1, said swingable frame comprising longitudinal members and a central track for supporting a roller carried by a boat, said central track extending forwardly of said longitudinal members, members secured to the forward ends of said longitudinal members and inclined toward each other, the forward ends of said inclined members being secured to said central track, the central track extending beyond said inclined members and carrying a sheave at its forward end, and a cable winch carried by said fixed frame and having a cable extendable around said sheave.

12. The combination according to claim 11, further provided with means carried by said fixed frame at its forward and rear ends for securing said swingable frame in its carrying position.

13. A device for loading and carrying boats on pickup trucks comprising a fixed frame and a swingable frame, said fixed frame having a plurality of posts at forward and intermediate portions of the truck box and a pair of horizontal longitudinal members secured to said posts and extending rearwardly therefrom, means supporting the rearward ends of said longitudinal members, the space between the rearward portions of said longitudinal members and said truck box being clear, a cross member on said fixed frame, the swingable frame being pivotally supported on said cross member, said swingable frame comprising a pair of longitudinal members slightly inwardly of said fixed frame longitudinal members and a central track extending forwardly of said longitudinal members, means extending between the forward ends of said longitudinal swingable frame members and said central track, a cable winch carried by said fixed frame for loading a boat onto the swingable frame, a cable extending from said winch and around a sheave at the forward end of said central track, extension means removably connectable to said central track for permitting it to reach the ground when the swingable frame is in an inclined loading position, a plurality of cross members on said swingable frame for supporting gunwales of a boat mounted thereon, and means carried by rearward portions of said fixed frame for locking said swingable frame in a generally horizontal carrying position.

* * * * *